B. LOOMIS.
PROCESS OF TREATING SEEDS AND NUTS FOR OBTAINING OIL AND OTHER PRODUCTS.
APPLICATION FILED MAY 5, 1915.
1,244,995. Patented Oct. 30, 1917.
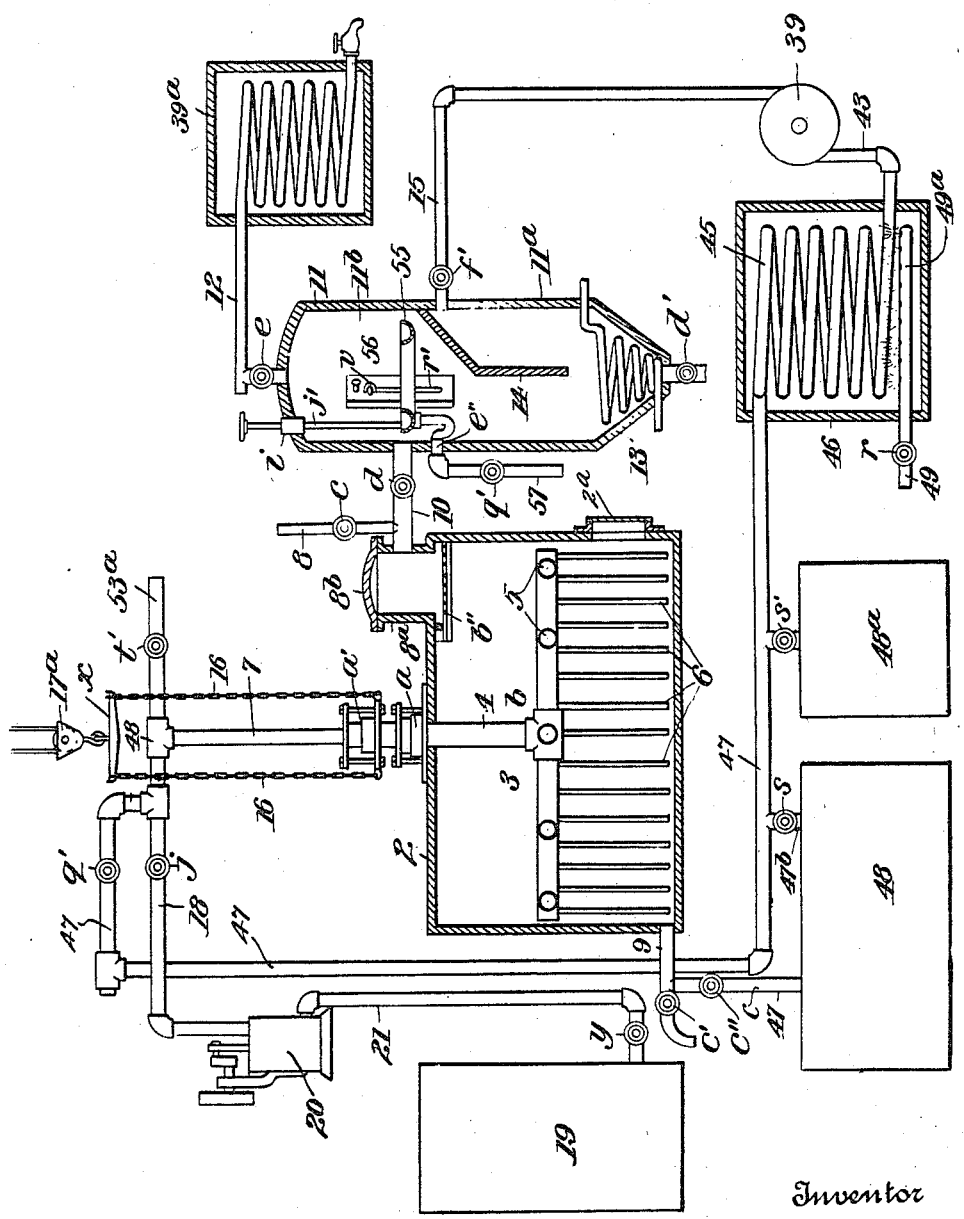
Witnesses
C. M. Walker
J. N. Bowers
Inventor
Burdett Loomis
By E. B. Clark
Attorney

UNITED STATES PATENT OFFICE.

BURDETT LOOMIS, OF HARTFORD, CONNECTICUT, ASSIGNOR TO THE BURDETT LOOMIS CORPORATION, OF HARTFORD, CONNECTICUT, A CORPORATION OF CONNECTICUT.

PROCESS OF TREATING SEEDS AND NUTS FOR OBTAINING OIL AND OTHER PRODUCTS.

1,244,995.  Specification of Letters Patent.  Patented Oct. 30, 1917.

Application filed May 5, 1915. Serial No. 25,996.

*To all whom it may concern:*

Be it known that I, BURDETT LOOMIS, a citizen of the United States, residing at Hartford, in the county of Hartford and State of Connecticut, have invented certain new and useful Improvements in Processes of Treating Seeds and Nuts for Obtaining Oil and other Products, of which the following is a specification.

This invention relates to a process of treating seeds and nuts for obtaining oil comparatively free from coloring matter and tannic acid, and having a sweet, pleasant taste, or being bland and free from acrid, bitter qualities, so that little or no refining will be required after extraction.

The object of my invention is to provide for first extracting and removing tannic acid and coloring matter from seeds and nuts, such as cotton seed, sunflower seed, peanuts, cacao beans, castor oil beans, cocoanuts, and palm nuts, and then dissolving the gummy or waxy matter on the outer cortex or envelop by means of gas and acetic acid diffused in hot water discharged in numerous streams into contact with the seeds or nuts under treatment, at the same time drawing off the tannic acid solution and afterward treating the material with hot acidulated water and floating off the oil with the hot liquor, separating the oil therefrom in a condenser or separate vessel after cooling, while at the same time the hot water and acetic acid which has been freed from oil and gummy matter is repeatedly reheated and circulated in contact with the material under treatment.

The process of extracting and removing the oil and circulating the hot water, hot gas and acetic acid solvent is practically continuous, till the batch or charge of seeds or nuts is exhausted,—that is, the oil practically all removed—and then treating the starchy matter, ammonia, phosphoric acid and proteids left in the treating tank so as to provide an animal food, or for use in preparing other food.

I preferably first remove tannic acid and coloring matter from the seed or nut material, as they can be extracted at a low temperature, between 70° and 120° F., and if left in the seeds or nuts during the period of extracting the oil at a higher temperature they combine with the oil and starch, imparting thereto a dark color and a bitter acrid taste, and cannot be washed out with water alone, but must be removed by a chemical treatment and bleaching agents, entailing additional expense.

I have discovered that acetic and other fatty acids, gases, etc., when diffused in hot water, are an excellent solvent for the gummy and resinous materials found in seeds, nuts, and their shells or envelops, and that, if the solvent mixture or solution is circulated in contact with the material to be treated at a temperature between 170° F. and 200° F. the contained oil and gummy matter will be quickly liberated and may be drawn off with the circulating water. The volatile matter will pass off in the form of vapor and will be condensed, the oil will float off with the water and be removed by a skimmer, and the resinous or gummy matter will pass off in a semi-liquid condition and will after cooling be deposited and recovered. By thus conducting the process at a low temperature the tannic acid, coloring matter and acetic acid will not combine with the oil, so that the latter will be left clear and sweet and require very little, if any, subsequent refining operation by treatment with chemicals or bleaching agents.

The matter constituting my invention will be defined in the claims.

I will now describe my process in detail by reference to the accompanying drawing, which represents a sectional elevation of one form of apparatus adapted for carrying out the process.

In the apparatus I provide an extracting tank 2, having numerous inlet tubes for liquid which is discharged in fine streams under pressure into the material, a skimming and depositing chamber 11, 11$^a$, heating coils 45 located in a furnace below the bottom of the tank 2, a condenser 39$^a$ and a gas supply tank 19 and pump 20, these parts being suitably connected by valved pipes, and a liquid circulating pump being used in the connecting pipes. The treating tank 2 may be constructed of boiler iron or other suitable sheet metal, fitted with a distributing pipe system 3 for distributing in the liquid numerous streams of gas, acetic acid and water. A comparatively large central distributing pipe 4 is arranged to slide in a stuffing box $a$ and connects telescopically with a fixed inlet pipe 7, the upper end of the pipe 4 having a stuffing box $a'$ for making a tight joint with pipe 7. The inlet pipe 4 can thus slide telescopically up and down over pipe 7 for raising and lowering the distributing pipes. The lower end of pipe 4 is provided with a fitting $b$ with which connect a series of radiating and circular pipes 5 which are provided with numerous small depending discharge pipes 6, adapted to extend to the bottom of the tank as shown when the pipe 4 is slid downward. The tank 2 is provided at the top with a supply pipe 8 having a valve $c$ connecting with pipe 10 for admitting acetic acid from any suitable source, such as an elevated tank, not shown here. The tank 2 is also provided at the bottom with a draw-off or drain pipe 9 having a valve $c'$.

With a flange at the upper end of the pipe 4 I preferably connect a chain or chains 16 which connect with a bar $x$ which connects with a pulley for raising the distributing pipes 5, 6. The distributing pipes may be lowered and adjusted in any suitable manner. A gas supply pipe 18 connects with the upper end of the inlet pipe 7 and leads from a pump 20 which connects by a pipe 21 with a gas supply tank 19.

The skimming and depositing chamber 11, $11^a$ is of a suitable size for permitting the liquid to partially cool and permit gummy matter to settle. This chamber is made with a tapering lower end terminating with a discharge pipe having a valve $d'$ for drawing off resinous or gummy matter. A steam coil 13 is placed in the lower end of chamber $11^a$ for melting resinous or gummy material in case it becomes cold and hardened. At about the middle height of chamber 11, $11^a$ is placed a separating dome or hood 14, which may be attached at its edges to the wall of the chamber, as shown, and an outlet pipe 15 connects with the wall of chamber $11^a$ at the top of the dome and is provided with a valve $f'$. The dome is located below the connection of the water and vapor discharge pipe 10 from treating tank 2 and provides an oil skimming chamber or space $11^b$ above it, and a depositing or catch-all chamber or space below it. This dome acts as a deflector and separator to cause the gummy matter to be deposited in the bottom of chamber $11^a$ while the water or treating liquid flows up into the dome and thence off to the circulating pump 39. A positively acting rotary pressure pump 39 is preferably used, through some other kind of positive pressure pump may be employed. A discharge pipe 43 connects with the pump and leads to the lower end of a series of heating coils 45 suitably supported in a furnace 46. Gas is preferably burned in the fire chamber and is supplied by a pipe 49 having a valve $r$ and a burner $49^a$ of any suitable kind in the fire chamber.

In order to secure satisfactory heating and circulation of liquid through the apparatus, the heater is located so that the top thereof is below the bottom of the treating tank 2.

A water supply pipe $53^a$, having a valve $t'$, connects with the T 48, connecting with the inlet 7, of tank 2.

In the chamber 11 is provided an annular skimmer trough 55, having attached brackets or hangers 56 which are slotted at $r'$ and engage with guide pins or staples $v$ fixed to the wall of the chamber. This skimmer trough is preferably constructed to float on the surface of the water or solvent liquor—with its bottom below the surface, so that oil floating on top of the liquor will pass over its upper edges and into it. The upturned sides of the trough may be notched or perforated to permit the oil to flow into it from the surface of the liquid. To the bottom of the trough is fixed an outlet nipple, to which is connected a flexible pipe $e''$ in the wall of the chamber 11. To the outer end of the pipe $e''$ is connected a discharge pipe 57 having a valve $q'$ for drawing off oil, which may be conducted to a storage tank or any suitable receptacle. The trough may be constructed to float, or may be adjusted up and down to the required level by a rod $j'$ passing through a stuffing box $i$ in the top of chamber 11.

It will be understood that by admitting a small flow of water to the circulating system the level in chamber 11 will be raised and the oil thus floated into skimmer trough 55, from which it may be drawn off by opening valve $q'$ in pipe 57. The inlet valve for water and the outlet valve $q'$ for oil may be so set as to provide for continuously drawing off a small stream of oil, or the oil may be drawn off at intervals.

When seeds and nuts are crushed and subjected to pressure in a filter press in the ordinary way the oil expressed is often dark-colored and bitter or acrid, and commands only a low price in the market, since it requires expensive treatment for refining it to impart an acceptable color and taste. These objectionable properties are due largely to the presence of tannic acid and coloring matter which can be removed before extracting the oil from the seeds or nuts. I therefore first remove these constituents and then the oil, obtaining the latter in a comparatively bright, clear, sweet or bland condition.

In operating the apparatus for carrying out my process, the tank is filled with preferably fresh seed or nuts through the mouthpiece $8^a$, the cover $8^b$ being removed for that purpose, and the sliding screen $b''$ being at the time open. The tank 2 is preferably filled up to the screen $b''$ and then the latter closed.

Now, the system, including tank 2, chamber 11, $11^a$, and the coil 45, is filled with water, admitted by pipe 53ª and caused to rise to the level of discharge pipe 10. Gas is then ignited at the burner 49ª, and the circulating pump 39 is started. This causes circulation of water through the heating coils and thence through the treating tank 2 in contact with the seed or nut material. The water, before being admitted, may be mixed with the desired per cent. of acetic acid, and additional acid may be admitted through pipe 8 as required. A non-oxidizing gas, such as hydrogen and carbon monoxid, may also be admitted through pipe 18.

I first proceed to extract and remove tannic acid and coloring matter from the seed and nut material by circulating water, acetic acid and gas at a temperature between 100° F. and 170° F. through the body of the material in the tank. Circulation of acidulated water at this low temperature is continued until all, or most, of the tannic acid and coloring matter have been extracted, then the acid solution is drawn off into a tank 48 by opening valve $s$ in pipe 47ᵇ and valve $c''$ in pipe 47ᶜ.

The system is again filled with water and acetic acid solvent and pump 39 put in operation and the heat increased in the furnace 46. As the circulating acidulated water becomes heated, approximately to 212° F., it soon commences to disintegrate the cellular structure and release the volatile matter and oil from the seeds. The vapor and oil pass with the water or liquor into chamber 11, 11ª, where the volatile vapors separate and fill the vapor space at the top from which they pass off through pipe 12 to the condenser 39ª where condensation is effected. The oil overflows into the skimming trough 55 and is drawn off through pipe 57, either continuously or intermittently. At the same time the circulating acidulated water containing resinous or gummy matter or a solution thereof, which has been released from the seeds or nuts is passed down over the separating dome 14, where such matter is separated and caused to settle into the depositing chamber 11ª, where it collects, while the liquid passes up and through the separating dome 14 and thence by pipe 15, the circulating pump 39, and pipe 43 into the bottom of the heating coils and thence up through the coils and pipe 47 into pipe 7, down through the distributing pipes 5 and numerous tubes 6 into the bottom of the tank, so as to rise through the material. By circulating the hot water or solvent liquor down and then up through the seed or nut material in tank 2, the oil and gummy matter are carried upward and floated off with the acid water through pipe 10 into chamber 11, 11ª, where the gummy matter is deposited.

In this second treatment the percentage of acid in the water is increased to make a stronger extracting solution for acting more rapidly on the seed or nut material to release the oil.

The circulating hot water or solvent liquor in tank 2 agitates the body of crushed material and prevents packing, and continuously carries away the extracted oil and gummy matter so as to continuously bring fresh liquor into contact with the seeds to effectively exert its solvent action on the cellular structure thereof and release the oil and the gummy and resinous constituents. In the skimming and depositing chamber 11, 11ª, the volatile matter and oil readily separates from the liquor, and at the same time the liquor is partially cooled so that the gum is hardened and will readily settle in the bottom of chamber 11ª. The velocity of the flow of liquor is much retarded in the skimming and depositing chamber, thereby facilitating the deposit of gum. This action is also aided by the small overflow outlet pipe 15 from the top of the separating dome 14.

The temperature of the water or liquor may be gradually raised in the heating coils to approximately 200° F. The operation may be continued for a period varying from two to twelve hours, according to the character of seeds or nuts being treated.

At suitable intervals, the valve $d'$ may be opened and the resin or gum discharged from the chamber 11ª, but this may be mostly discharged at the end of the operation.

Instead of filling the system with fresh water, after the tannic acid has been drawn off, it may be filled with a solvent solution containing acetic acid and other solvents from a previous treatment.

When the treatment and extraction of oil in tank 2 is completed, the valve $e$ may be closed and the blow-off valve $s'$ opened, permitting the water or liquor containing the acetic acid and any remaining oil to be blown off into the storage and settling tank 48ª where it is reserved for treating a succeeding charge of seeds or nuts in tank 2. The oil which may remain in the liquor discharged into tank 48ª may be drawn off from the surface or separated in any well known manner.

A non-oxidizing gas, such as carbon dioxid, hydrogen and nitrogen may be forced under pressure through a pipe 18 and valve $j$ into pipe 7 and the system 5 and 6 down to the bottom of tank 2 for blowing out the solvent liquor into tank 48ª. The pulp of the seeds after being well drained may be discharged from tank 2 through door 2ª, and subjected to pressure in a filter press for pressing out any remaining oil. Starchy matter and proteids will then remain in the cake and will make an excellent food for stock as it will be practically free from oil.

Instead of discharging the seed pulp directly after extracting the oil with water and acetic acid solvent solution, it may be retained in tank 2 for treatment with warm or hot gas. A non-oxidizing gas, composed principally of nitrogen, hydrogen and carbon dioxid or monoxid may be circulated at a temperature ranging between 200° F. and 300° F. through the seed pulp or meal for carrying off any ammonia present and drying the meal for stock food. The gas passing from the tank may be passed through a condenser 39$^a$ for condensing ammonia or other volatile matter carried by the gas.

In any process the gummy or waxy coating found on the cortex of most seeds and nuts, together with coloring matter, will be dissolved and extracted by the circulating acidulated water at a temperature between 100° and 150° F. When this solution and extraction have been effected the circulating pump is stopped and the liquor is drawn off from tank 2 into the settling and storage tank 48$^a$ for subsequent treatment by evaporation to prepare a waterproofing varnish.

By the above method the seed and nut material will be left cleaner and sweeter for the production of sweet clear oil, substantially free from acrid, bitter taste and of light color.

After the seeds or nuts have been cleaned as above described the second treatment with a stronger acetic acid solution is effected at a higher temperature, between 150° F. and 200° F., and any oil which is not removed by the skimmer in tank 11, 11$^a$ will be drawn off with the liquor into settling tank 48 or 48$^a$ and allowed to cool, when the oil will rise to the surface and can be siphoned off or drawn off from the water in any well known way.

The meal remaining in tank 2 and containing protein and starchy matter may be dried by circulating through the mass of warm non-oxidizing gas, composed principally of hydrogen and carbon dioxid or carbon monoxid at a temperature of 200° to 300° F. At this time the cove 8$^b$ may be removed and the gas and moisture allowed to escape into the open air. The meal having been thus dried may be removed through the opening and door 2$^a$ at the bottom of tank 2 and subsequently purified by separating the remaining particles of corticle and then grinding or otherwise disintegrating the meat for a food product.

After the first treatment of the seed or nut material with acidulated water and gas to remove coloring material the seeds or nuts may be decorticated by a machine in a well known manner before the second treatment to extract the oil.

Having described my invention, what I claim, and desire to secure by Letters Patent, is:

1. The process of extracting oil from seeds and nuts which consists in subjecting them in a closed tank to the action of hot water and acetic acid solvent, causing the solvent solution to circulate in contact with the material and release the oil and gummy or resinous matter, floating the oil and gummy or waxy matter off with the water and separating the oil from the water, collecting the heavier gummy or resinous matter and then reheating the acidulated water and again passing it through the material.

2. The process of extracting oil from seeds and nuts which consists in subjecting them in a closed tank to the action of hot water, acetic acid solvent and gas diffused therein, passing the water and gas solvent from the treating tank through a separate tank and therein skimming off and removing the oil and separately collecting resinous or gummy matter, thence passing the water solvent and gas through a heater and thence in contact with the seed or nut material repeatedly till the oil is sufficiently extracted.

3. The process of extracting oil from seeds and nuts which consists in subjecting them in a closed tank to the action of hot water and acetic acid solvent diffused therein, passing the water and solvent from the treating tank through a separate tank and therein skimming off and removing the oil and separately collecting waxy or gummy matter, thence passing the water and solvent through a heater and thence in contact with the seed or nut material till the oil is sufficiently extracted, then drawing off all the liquid portion and passing a hot neutral, non-oxidizing gas through the remaining material to carry off ammonia or other volatile matter and dry the material.

4. In the treatment of seeds and nuts with hot water and a solvent diffused therein, the process which consists in circulating the water and solvent up through the body of seed or nut material and thereby floating off the oil and gummy or waxy matter out of the tank into a separate chamber, therein allowing the liquor to become quiescent and then skimming off the oil in said chamber and drawing it off into a receptacle and at the same time allowing the gummy or waxy matter to settle.

5. The process of extracting oil from seeds and nuts, which consists in first extracting from seed or nut material tannic acid and coloring matter by circulating in contact therewith water and acetic acid solvent at a temperature between 100° and 170° F., then drawing off and storing the tannic acid solution, then subjecting the material to the solvent action of hot water and acetic acid solvents, at an increased temperature, separating and saving the extracted constituents such as oil and resinons or gummy matter, then drawing off the solvent, liquor and remaining oil.

6. The process of extracting oil from seeds and nuts, which consists in first extracting from seed or nut material tannic acid and coloring matter by circulating in contact therewith water and acetic acid at a temperature between 100° and 170° F., then drawing off and storing the tannic acid solution, then subjecting the material to the solvent action of hot water and acid solvents, at an increased temperature, separating and saving the extracted constituents such as oil and waxy or gummy matter, then drawing off the solvent liquor and remaining oil, and then circulating gas at a gradually increasing temperature in contact with the material till it is freed from ammonia or other volatile matter, and dried.

7. The process of extracting oil from seeds and nuts, which consists in forcing through them in a closed tank numerous streams of acidulated water and gas, floating off with the liquid oil and waxy or gummy material and separating the same from the liquid in a separate chamber, then reheating the liquid and again forcing it in numerous small streams through the body of the material and thus repeating the operation and adding gas to the liquid till the material has been sufficiently treated.

8. The process of extracting oil from seeds and nuts, which consists in first forcing through a body of the material streams of water, and an acid solvent at a temperature between 70° and 170° F. to remove tannic acid and coloring matter and drawing off the extract, then forcing streams of a stronger acid solution and at an increased temperature through the material to extract oil and gummy or waxy material, separating such oil and material from the liquor in a separate chamber and reheating the remaining liquor repeatedly and forcing it through the material under treatment.

9. The process of treating seeds or nuts to extract oil and separate gummy and waxy matter, which consists in subjecting the seed, or nut material in a closed tank to the action of hot water and acetic acid solvent, floating off the oil and gummy or waxy matter with the solvent liquor and allowing to become quiescent in a separate chamber, therein separating the oil and gummy or waxy matter from the liquor and repeatedly circulating such liquor through the material.

10. The process of treating seeds or nuts to extract oil and separate gummy and waxy matter, which consists in forcing into and through a body of the material in a closed tank numerous streams of warm or hot water containing an acid solvent and causing the solvent liquor and extracted matter to overflow into a separate chamber, and repeatedly circulating and forcing the solvent liquor in streams through the seed or nut material till the oil is sufficiently extracted.

In testimony whereof I affix my signature in presence of two witnesses.

BURDETT LOOMIS.

Witnesses:
J. L. CROWLEY,
JENNIE H. EVANS.